United States Patent Office 3,183,922
Patented May 18, 1965

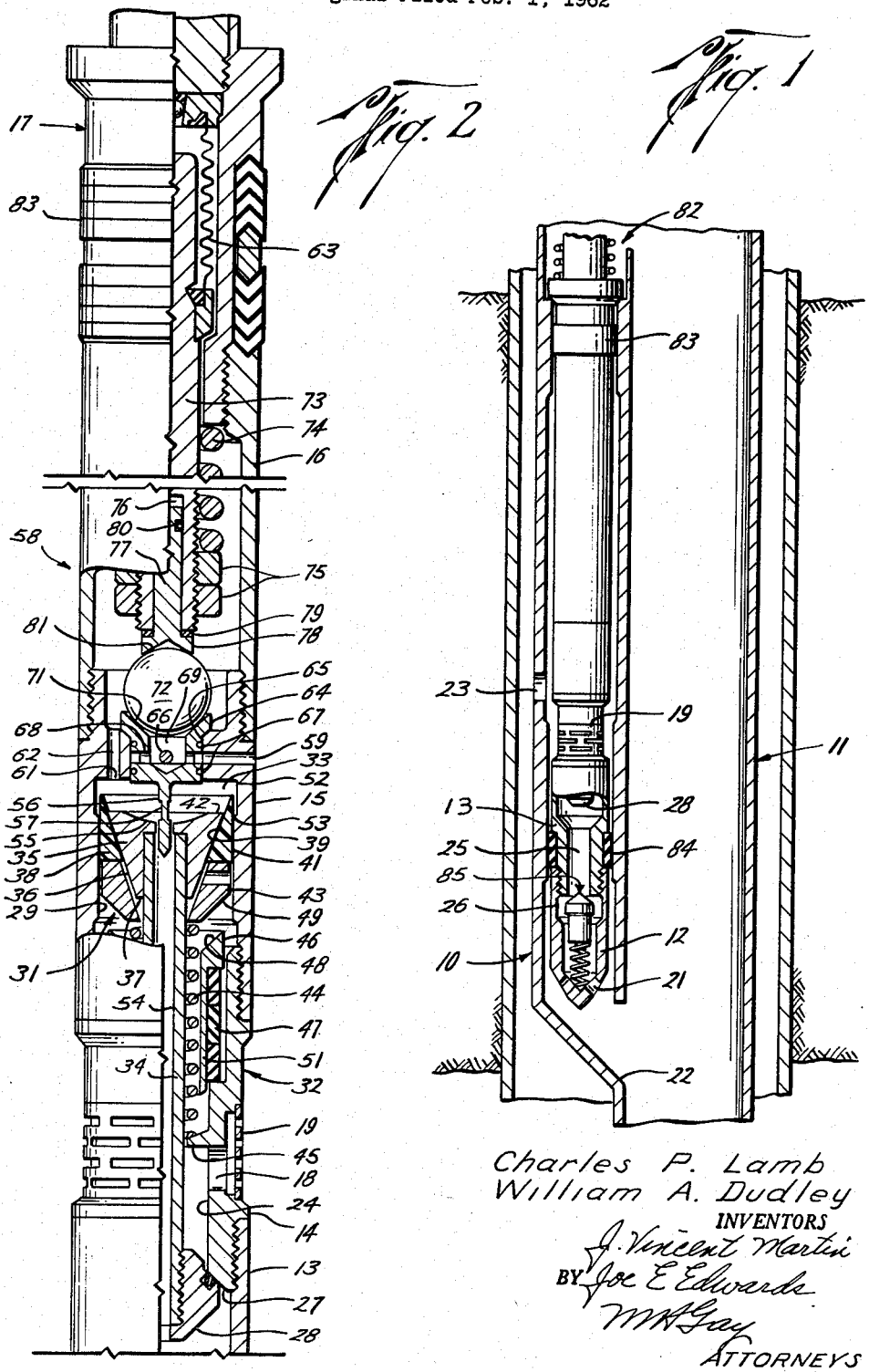

3,183,922
GAS LIFT VALVE
Charles Paul Lamb and William A. Dudley, Dallas, Tex., assignors to Merla Tool Corporation, Garland, Tex., a corporation of Texas
Continuation of application Ser. No. 170,593, Feb. 1, 1962. This application Aug. 18, 1964, Ser. No. 390,408
10 Claims. (Cl. 137—155)

This invention relates to valves, and more particularly to gas lift valves of the pilot operated types.

This application is a continuation of our application Serial No. 170,593, filed February 1, 1962, now abandoned.

In pilot operated gas lift valves a power piston is exposed to casing pressure on one side and selectively to casing and tubing pressure on the other side in response to opening and closing of a pilot valve.

The seal between the power piston and the cylinder in which it reciprocates is one of the perimeters determining the useful life of the valve. In the past, this seal has been provided for the most part by an O-ring. Trash, such as salt precipitate and other foreign matter, has been the principal enemy of piston seals in the past, and it is the principal object of this invention to provide a valve in which the effect of foreign matter on the piston seal is greatly minimized.

Another object is to provide a piston seal for pilot operated gas lift valves which will withstand scoring or broaching without leaking.

Another object is to provide in a pilot operated gas lift valve a wall scraper to remove salt precipitate or other foreign matter from the cylinder in which the power piston reciprocates.

Another object is to provide a design of piston top which will direct foreign particles directly through the bleed hole in the piston and thus avoid salt buildup of particles large enough to plug the bleed hole.

Another object is to provide in a pilot operated gas lift valve a piston seal which will give light frictional forces during piston movement but will seal several thousand pounds of differential during the stationary period.

Another object is to provide a piston seal for pilot operated gas lift valves which will withstand 300° F. indefinitely, as well as substantially all chemical attack found in an oil well.

Another object is to provide a piston seal for pilot operated gas lift valves which will be able to mechanically absorb all particles too small for the piston to wipe off of the cylinder wall, thus minimizing damage to the cylinder wall.

Another object is to provide a piston seal for gas lift valves which is simple to build and assemble, and is easy and inexpensive to repair.

Another object is to arrange the piston seal of a pilot operated gas lift valve in conjunction with the bumper means of such valve in such a manner that the resistance to movement provided by the bumper means is applied directly to the piston seal, which seal has a good ability to absorb impact without permanent deformation, and which during impact applies a friction-braking action against the wall of the cylinder.

Another object is to provide a piston seal as in the preceding object in which the impact load serves to keep the piston seal conditioned to the cylinder and piston by compensating for wear and forcing any fine particles finding their way between the sealing surfaces to imbed in the piston seal in such a way that the piston seal may remain in close contact with the piston and the wall of the cylinder without damage to either.

Other objects, features and advantages of the invention will be apparent from the drawings, the specification and the claims.

In the drawing:

FIGURE 1 is a view partly in vertical section and partly in elevation showing a valve constructed in accordance with this invention in operating position in a tubing string; and, FIGURE 2 is a view partly in half-section and partly in quarter-section illustrating details of a preferred form of valve embodying this invention.

FIGURE 1 illustrates the valve of this invention in position in the side pocket indicated generally at 10 of a mandrel 11 forming a portion of a flow tubing. In the form illustrated, the valve is designed for wire line operation. It will be apparent to those skilled in the art that, by changing the outlet sub 12 to the type commonly used with permanently installed valves, the valve could be secured to a lug on the exterior of a mandrel in the conventional manner. Of course, the side pocket packing would not be utilized as it would serve no useful purpose.

A tubular housing is provided by a number of housing parts for ease of assembly. Beginning at the bottom of the valve, the lowermost part is the bottom sub or cap 12. Above the sub 12 is a packing adapter 13 which is connected to the lower end of the inlet thimble assembly 14. Above the thimble assembly 14 is a valve seat housing 15 which is connected to the lower end of spring housing 16. The upper end of the housing is completed by the upper packing adapter 17.

A fluid inlet is provided in the housing at 18 in the inlet thimble assembly. Preferably, a number of inlet ports 18 are provided and this section of the inlet thimble assembly is surrounded by a screen 19 to screen out trash from the flow stream.

An outlet 21 is provided in the bottom cap and, as shown in FIGURE 1, communicates through port 22 with the interior of the flow tubing provided by mandrel 11. The inlet screen 19 is provided in a section of the side pocket 10 where it communicates with opening 23 so that fluid from the casing annulus may pass from opening 23 to the inlet of the valve 18.

A flow passageway connects the inlet and outlet to convey fluid from the casing into the tubing mandrel 11. This passageway is provided by a bore 24 in the inlet thimble assembly 14, a bore 25 through the lower packing adapter 13, and a bore 26 through the bottom cap 12.

A valve seat is provided at 27 by a downwardly and outwardly facing frusto-conical surface on the lower end of the inlet thimble assembly 14. A main valve member 28 cooperates with the valve seat 27 to control flow of fluid through the valve.

Control of the main valve is provided for by a power assembly. The power assembly is provided by a cylinder 29 in the valve seat housing 15 and a piston indicated generally at 31 reciprocal in cylinder 29.

The cylinder 29 is exposed on its lower side to casing pressure through the bumper assembly indicated generally at 32. The upper end of the cylinder is closed providing a chamber 33 above the piston 31.

The piston 31 is connected to the main valve member 28 through stem 34 so that movement of the piston will effect movement of the main valve member. It will be noted that the large end of the piston member 35 has a smaller diameter than the diameter of the cylinder 29.

The piston assembly includes a piston member 35 having a rigid frusto-conical periphery 36 with the small end 37 thereof facing the main valve member.

The seal for the piston assembly is provided by an annular seal member 38 mounted on the piston member 35. The seal member is formed of polytetrafluoroethylene, commonly known as "Teflon," or some other material having the same characteristics. An important characteristic of this material is its low coefficient of friction which permits it to provide a seal with very light frictional forces during piston movement and yet which will seal against several thousand pounds of differential, at least, during the stationary period. Teflon will withstand temperatures on the order of 300° F. indefinitely, and will withstand attack from all chemicals normally found in an oil well. Teflon will mechanically absorb by imbedding all particles too small for it to wipe off of the cylinder wall 29, thus minimizing the damage to the cylinder wall. Teflon has good ability to absorb impact without permanent deformation.

The Teflon seal member is formed with an inner frusto-conical wall 39 to conform to the outer periphery 36 of the piston member. The Teflon seal member 38 has an outer cylindrical wall 41 to conform to the wall of the cylinder 29.

Preferably, the angle of the frusto-conical wall 36 on the piston member 35 is sufficient to be self-releasing from the seal member to avoid sticking of the seal member to the piston member. It is also preferred that the outer diameter of the seal member be slightly larger than the diameter of cylinder 29 to give a slight preloading of the seal member against the cylinder. The small area end of the seal member 38 is unsupported and, in order to direct trash toward the center of the piston member, preferably extends beyond the large diameter end of the piston member. By providing this unsupported area on the seal member, the seal member can slide along the wedge surface on piston member 35 and be wedged into tight engagement with the cylinder 29.

Means are provided for urging the seal member upward toward the large end 42 of piston member 35. In the preferred form a bumper washer 43 bears against the lower end of seal 38 and a spring 44 is held in compression between the bumper washer 43 and an inwardly extending flange 45 on the lower end of valve seat housing 15. The force of spring 44 is sufficient to provide a slight plastic flow of the seal ring 38 to effect mating between the seal member and the piston member 35.

A bumper assembly is positioned in the path of the seal member as it moves toward open position of the main valve member. The bumper assembly is provided by bumper washer 43, by a bumper member 46 and resilient means such as the bumper rubber 47 supporting the bumper member in the path of the bumper washer as the piston member moves toward valve-opening position. The upper end of the bumper member 46 has a surface 48 adapted to engage the downwardly facing surface 49 of the bumper washer when the piston moves toward valve-opening position. As these parts are engaged, the bumper rubber 47, which is confined between the inlet thimble assembly and a sleeve 51 depending from the bumper member 46, is compressed. It will be noted that the confinement of the bumper rubber between the sleeve and thimble is such as to permit it to substantially double in radial dimension before completely filling the cavity between the sleeve and thimble. In this manner a substantial travel of the piston is permitted while the bumper assembly and the spring 44 build up resistance to downward movement of the piston. As soon as the bumper rubber 47 is completely compressed, downward movement of the bumper member is substantially arrested. By having this arresting movement transmitted from the bumper member through the bumper washer to the seal 38, the frictional engagement of the seal member with the cylinder is increased to thereby absorb a portion of the energy of the downwardly moving piston. It has been found that this arrangement of transmitting the impact force to the piston rubber will result in the imbedding in the rubber of any particles which were too small to be wiped from the cylinder wall. This imbedding will minimize scoring of the cylinder wall.

The upper extremity of the cylinder wall is provided with an enlarged diameter section 52. This results in a shoulder 53 which acts as a wiper to wipe solid particles from the exterior of the seal member 38. Said solid particles may be trash, or may be salts which tend to build up in some wells.

The piston member 35 is constructed in a manner to direct any solid particles which occur in the chamber 33 above the piston on through the valve.

It is conventional in valves of the type illustrated to have a bleed port 54 which extends through the piston member 35 and the valve stem to place the upper end of the cylinder 33 in communication with the passageway through the valve downstream of the main valve seat 27. In order to direct trash through this bleed passageway, the upper end of piston member 35 is dished in, as shown at 55, so that any particles of trash falling on the top of the cylinder will tend to be directed to the bleed passageway.

To permit free passage of trash, the bleed passageway should be as large as possible. On the other hand, the size of this passageway controls the speed with which the piston will snap the main valve member to full open position. For this reason, the bleed passageway through the piston member 35 and the stem 34 is made large and a depending member 56 extends into the inlet of the bleed passageway. The length of the member 56 is such that it will effectively reduce the size of the bleed passageway until the main valve member 28 is almost in fully open position. As the main valve member moves to fully open position, the piston member 35 will move below the depending member 56 to clear the bleed passageway and open up the inlet to the bleed passageway to thus permit any trash to freely move into the bleed passageway and pass through the valve. It will be noted that there is a reduced diameter section 57 on the depending member 56 which begins approximately at the lowermost level of the dished in portion 55 of piston 35. This prevents any buildup or accumulation of trash which might interfere with free movement of the piston.

From the valve as thus far explained, it is apparent that the lower face of the control piston is always exposed to casing pressure, and the upper face of the piston is always exposed to at least the pressure in the tubing. In accordance with conventional construction in valves of this type, a pilot valve indicated generally at 58 is provided for selectively admitting casing pressure to the closed end of cylinder 31 to thus selectively increase the pressure above the piston to casing pressure. It might be noted at the outset that the valve 58 may be utilized as a pilot valve for controlling a main valve such as main valve member 28, or, in the alternative, the pilot valve may be used as a flow valve. In other words, if the control piston be omitted and the lower end of the valve seat housing 15 connected directly to the tubing, the valve may be used as a flow valve. An inlet into the pilot valve is provided by a port 59 in the valve seat housing 15. An outlet is provided which for purposes of considering the operation of the pilot valve may be considered to be the outlet 61 in the valve seat housing. Of course, the outlet 61 communicates through the valve stem 34 with the outlet 21 of the main valve. A passageway connects the inlet 59 and the outlet 61. This passageway is provided by a plurality of bores 62 through the valve seat housing and opening into the top of chamber 33. The bore 62 communicates with the spring housing so that tubing pressure or downstream pressure will normally be applied to the bellows 63 when the valve is closed. The pilot valve passageway is completed by the valve seat member shown at 64. The member 64 is tubular in form and is held in a tubular bore 65 in valve seat housing 15 by a valve seat lock pin 66. This pin extends into the seat member from the exterior of the housing. A pair of O-rings 67 provide spaced seals between the valve seat member and the bore 65. The seals are positioned to bridge the inlet 59 and the valve seat member has a plurality of ports 68 to permit casing fluid to flow into the bore 69 which extends upwardly from the ports 68 to the top of the valve seat member.

A valve seat is provided at the top of the valve seat member by an upwardly and outwardly flaring frustoconical surface 71. A valve member is provided by a ball 72 which cooperates with seat 71 to control flow therethrough. By using a spherical ball and the frustoconical seat surface 71, it will be apparent that the effective area of valve seat 71 will be dependent upon the diameter of ball 72. Thus, by selecting the proper diameter of ball a desired spread characteristic between opening and closing of the pilot valve may be obtained.

It will be noted that the seating surface 71 faces downstream so that pressure fluid from the inlet 59 tends to move it from its seat. As the ball 72 is free, a reversal in pressure differential which would result in reverse flow through the pilot valve will be prevented by the ball valve member 72 acting as a check valve.

A valve stem 73 is mounted in the housing on the downstream side of the seat 71. The ball 72 is positioned between the seat 71 and the stem 73. Means are provided for resiliently urging the valve stem toward the seat. This means may include the spring 74 held under compression between jam nuts 75 on the valve stem and the lower extremity of the upper packing adapter 17. Also included in the means for resiliently urging the valve stem toward the seat is a bellows 63 connected to the valve stem and exposed to pressure fluid downstream of the seat 71.

It will be apparent that in order to have the spring 74 exert the same force with different size balls, it will be necessary to change the effective length of the valve stem 73. For this reason, the valve stem has a cylindrical opening 76 in its lower end. A plunger 77 is reciprocally mounted in the cylinder 76. This plunger has a head or radially extending flange 78 which is larger than cylinder 76. One or more spacer washers 79 may be introduced between the head 78 and the lower end of stem 73 to change its effective length. An O-ring 80 provides friction between the cylinder 76 and stem to releasably hold the plunger in position. As the plunger will be assembled under atmospheric conditions, it will be appreciated that in the well a differential will exist across the friction ring and the plunger will be firmly held against the stem 73.

Preferably, the lower face of the washer or head 78 has a downwardly facing conical surface 81 which engages the ball 72. With this configuration, the valve seat surface 71 and the conical surface 81 combine to form a cage for holding the ball 72 in a position to cooperate with seat 71. Travel of the ball 72 to full open position is normally about 1/16 of an inch. Under the most adverse conditions the travel will be about 1/8 of an inch. Thus, even with a relatively small ball the surfaces 71 and 81 will confine positioning of the ball to the proper area. Of course, any desired type of cage could be provided to hold the ball over the seat 71.

In operation the valve is run into the tubing which includes the mandrel 11 on a wire line. The wire line is attached to a wireline latch assembly, a portion of which is indicated generally at 82 in FIGURE 1. The valve is run into the side pocket 10 and landed in the position shown in FIGURE 1 in which the upper and lower spaced seals 83 and 84, respectively, will seal between the valve and the side pocket above and below the inlet 23. Thereafter, the fluid within the well may be lifted by gas introduced through the gas lift valve in the conventional manner. The pilot valve will be set to open at a selected casing pressure. This pressure will depend upon the size of the ball 72 and the amount of tubing pressure effective on the bellows 63 and ball 72. For instance, if ball 72 has an effective area equal to the area of bellows 63 and the bellows 63 be charged at atmospheric pressure, the effect of tubing pressure will be substantially eliminated and the valve will open and close in response to casing pressure only. In other words, the spread of the valve will be approximately zero. If it is desired to have the valve closed after casing pressure has dropped a selected number of pounds, the ball 72 will be slightly smaller to provide an effective area across the valve member less than the area of the bellows. Then, when the valve 72 opens, a casing pressure will become effective on the bellows and will hold the pilot valve in open position until the casing pressure has dropped the selected number of pounds to permit the pilot valve to close. It will be apparent that the ball will seat in random orientation, and thus a new surface will be constantly presented to the valve seat. If a slight nick is incurred in the ball, the chance of seating on that exact point is very small. The change in spread characteristics may be readily accomplished in the field by changing the size of ball.

Prior to opening of the pilot valve, tubing pressure will be present in chamber 33 and casing pressure is effective on the bottom side of the piston member 35. The differential across the seal member 38 urges the seal member toward the larger end of the piston member 35. As this tightly wedges the seal member between converging surfaces, the seal member is capable of withstanding a substantial differential. As the pilot valve unseats, the pressure within chamber 33 quickly increases to casing pressure. The areas exposed to pressure on the opposite sides of piston member 35 and on the opposite sides of the main valve member 28 are such that an unbalance of force is now created which rapidly moves the main valve member to full open position. In so moving, it might be noted that the shoulder 53 will tend to wipe the upper edge of the resilient seal member 38 to remove trash therefrom. This trash will tend to fall on top of the piston member 35. Prior to opening and during opening movement the depending member 56 extends inot bleed port 54 in the valve stem 34 and permits only a slight bleed of fluid therepast. As soon as the valve reaches full open position, however, the piston member 35 moves far enough down to provide a full unobstructed opening to permit flow of trash through the valve. The dished shape of the top of the piston member 35 will direct any trash present above the piston to the bleed, and it will pass on through the valve.

As the piston moves toward open position, the bumper washer moves into engagement with the bumper member and begins to compress the bumper rubber. Thus, the inertia of the opening valve member is absorbed by the spring 44 and by the bumper rubber. If the bumper rubber is completely compressed within its confined chamber, it arrests further downward movement of the bumper washer. This arresting force is thus transmitted to the seal member 38 and results in imbedding of any material which lies between the seal member and the cylinder. After arresting downward movement, the piston will be permitted to move upwardly and seek an equilibrium position. At this time fluid from the casing will be flowing through the main valve, past the check valve indicated generally at 85 in the bottom cap, and thence into the tubing.

After casing pressure drops to the desired pressure, as determined by the spread selected by the size of ball 72, the pilot spring 74 will return the pilot ball 72 to seated position. The pressure in chamber 33 will then quickly drop to tubing pressure and the differential in casing pressure and tubing pressure across the piston 35 will move the piston member to closed position. It might be noted that the relationship of the areas exposed to casing and tubing pressure are preferably such that the main valve member will begin to move towrd closed position before the full differential is built up across the piston seal 38. This will permit the piston to move back to valve-closing position before the full differential occurs thereacross. As the valve moves to open position under a condition of low differential across the seal member, it will be appreciated that this design permits movement of the piston seal member 38 under conditions of low pressure differential. Thus, the design is such that low friction between the piston seal 38 and the cylinder is present at the time of opening and closing.

In the event of tubing pressure exceeding casing pressure, the pilot valve ball 72 will be held on its seat by this reverse pressure condition to prevent reverse flow therethrough. Also, the main back check valve 85 will be seated to prevent reverse flow through the entire valve. In view of the position of the main back check valve 85 in the preferred embodiment, it will be apparent that the greatest advantage of the use of a free ball as a back check as well as control valve member will occur when the structure herein referred to as a pilot valve is used as a main flow valve, or where the outlet from the pilot valve communicates with the tubing through a passageway which is not controlled by a main check valve.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a gas lift valve having a main valve member controlling flow through the valve and a piston member reciprocating in a cylinder for controlling opening and closing of the main valve member in response to opening and closing of a pilot valve, the improvement which consists in providing the piston member with a rigid frusto-conical periphery with the small end thereof facing the main valve member, and an annular seal member formed of polytetrafluoroethylene with an inner frusto-conical wall to conform to the periphery of the piston member and an outer cylindrical wall to conform to the wall of the cylinder, said piston member at its larger diameter section in engagement with the seal being substantially less in diameter than the inner diameter of said cylinder, said seal member having its small area end unsupported to permit the seal to slide along the piston member and be wedged between the piston member and cylinder.

2. In a gas lift valve having a main valve member controlling flow through the valve and a piston member reciprocating in a cylinder for controlling opening and closing of the main valve member in response to opening and closing of a pilot valve, the improvement which consists in providing the piston member with a rigid frusto-conical periphery with the small end thereof facing the main valve member, and an annular seal member formed of polytetrafluoroethylene with an inner frusto-conical wall to conform to the periphery of the piston member and an outer cylindrical wall to conform to the wall of the cylinder, and a bumper assembly lying in the path of the seal member as the piston member moves toward open position of the main valve member to impose the resistance provided by the bumper assembly directly on the seal member.

3. A gas lift valve comprising, a tubular housing, a main gas passageway through the housing, a main valve seat across said passageway, a main valve member cooperable with said valve seat and controlling flow through said passageway, a cylinder in the housing having one end closed and one end exposed to the exterior of said housing, a piston member reciprocable in the cylinder and connected to the main valve member to control operation thereof, said piston member having a rigid frusto-conical periphery with the small end thereof facing the main valve member, an annular seal member formed of polytetrafluoroethylene with an inner frustro-conical wall to conform to the periphery of the piston member and an outer cylindrical wall to conform to the wall of said cylinder, said piston member at its larger diameter section in engagement with the seal being substantially less in diameter than the inner diameter of said cylinder, said seal having its small area end unsupported to permit the seal to slide along the piston member and be wedged between the piston member and cylinder, means urging said seal member toward the large end of the piston member, a pilot gas passageway connecting the closed end of the cylinder with the exterior of said housing, pilot valve means mounted in the housing and controlling flow through said pilot gas passageway, and bleed passageway means connecting the closed end of the cylinder with the main gas passageway downstream of the main valve seat.

4. The valve of claim 3 wherein said cylinder at its closed end is provided with an enlarged diameter section to provide a shoulder which is passed by the end of the seal member when the piston member moves to valve-closing position.

5. A gas lift valve comprising, a tubular housing, a main gas passageway through the housing, a main valve seat across said passageway, a main valve member cooperable with said valve seat and controlling flow through said passageway, a cylinder in the housing having one end closed and one end exposed to the exterior of said housing, a piston member reciprocable in the cylinder and connected to the main valve member to control operation thereof, said piston member having a rigid frusto-conical periphery with the small end thereof facing the main valve member, an annular seal member formed of polytetrafluoroethylene with an inner frusto-conical wall to conform to the periphery of the piston member and an outer cylindrical wall to conform to the wall of said cylinder, means urging said seal member toward the large end of the piston member, a pilot gas passageway connecting the closed end of the cylinder with the exterior of said housing, pilot valve means mounted in the housing and controlling flow through said pilot gas passageway, bleed passageway means connecting the closed end of the cylinder with the main gas passageway downstream of the main valve seat, a bumper assembly including a bumper washer engaging said seal means, a bumper member, and resilient means supporting the bumper member in the path of said bumper washer as the piston member moves toward valve-opening position to apply the resistance offered by the bumper assembly directly to the seal means and increase the frictional drag on the cylinder.

6. The valve of claim 5 wherein said resilient means limits movement of the bumper member to a selected position.

7. The valve of claim 5 wherein said bleed passageway is provided in part by a passageway through said piston member and the end of said piston member remote from the main valve member is dished in to direct foreign matter toward the bleed passageway.

8. A gas lift valve comprising, a tubular housing, a main gas passageway through the housing, a main valve seat across said passageway, a main valve member cooperable with said valve seat and controlling flow through said passageway, a cylinder in the housing having one end closed and one end exposed to the exterior of said housing,
said cylinder having an enlarged section at its closed end to provide a shoulder,
a piston member reciprocable in the cylinder and connected to the main valve member to control operation thereof,
said piston member having a rigid frusto-conical periphery with the small end thereof facing the main valve member, the large diameter end of said piston member being substantially smaller than the diameter of the cylinder,
an annular seal member formed of polytetrafluroethylene with an inner frusto-conical wall to conform to the periphery of the piston member and an outer cylindrical wall to conform to the wall of said cylinder,
said seal extending beyond the large diameter end of said piston member and into the enlarged section of said cylinder when the main valve member is closed,
a pilot gas passageway connecting the closed end of the cylinder with the exterior of said housing,
pilot valve means mounted in the housing and controlling flow through said pilot gas passageway,
and bleed means extending through said piston member and the connection between the piston member and main valve member to connect the closed end of the cylinder with the main gas passageway downstream of the main valve seat.

9. In a gas lift valve having a main valve member controlling flow through the valve and a piston member reciprocating in a cylinder for controlling opening and closing of the main valve member in response to opening and closing of a pilot valve,
the improvement which consists in providing the piston member with a rigid frusto-conical periphery and an annular seal member formed of polytetrafluroethylene with an inner frusto-conical wall to conform to the periphery of the piston member and an outer cylindrical wall to conform to the wall of the cylinder, said piston member at its larger diameter section in engagement with the seal being substantially less in diameter than the inner diameter of said cylinder, said seal member having its small area end unsupported to permit the seal to slide along the piston member and be wedged between the piston member and cylinder.

10. In a gas lift valve having a main valve member controlling flow through the valve and a piston member reciprocating in a cylinder for controlling opening and closing of the main valve member in response to opening and closing of a pilot valve,
the improvement which consists in providing the piston member with a rigid frusto-conical periphery,
an annular seal member formed of polytetrafluroethylene with an inner frusto-conical wall to conform to the periphery of the piston member and an outer cylindrical wall to conform to the wall of the cylinder,
and a bumper assembly lying in the path of the seal member as the piston member moves toward open position of the main valve member to impose the resistance provided by the bumper assembly directly on the seal member.

References Cited by the Examiner

UNITED STATES PATENTS

| | | | |
|---|---|---|---|
| 2,343,751 | 3/44 | Crothers | 92—206 XR |
| 2,994,335 | 8/61 | Dudley | 137—155 |

FOREIGN PATENTS 788,253   12/57   Great Britain.

ISADOR WEIL, *Primary Examiner.*